US005925483A

United States Patent [19]

Kejha et al.

[11] Patent Number: 5,925,483

[45] Date of Patent: Jul. 20, 1999

[54] MULTI-LAYER POLYMERIC ELECTROLYTES FOR ELECTROCHEMICAL DEVICES

[76] Inventors: Joseph B. Kejha; Charles T. Kogis, both of 5115 Campus Dr., Plymouth Meeting, Pa. 19462

[21] Appl. No.: 08/642,967

[22] Filed: May 6, 1996

[51] Int. Cl.$^{6}$ .................................................. H01M 10/40

[52] U.S. Cl. .......................... 429/303; 429/306; 429/317

[58] Field of Search ................................... 429/192, 190, 429/145, 303, 306, 317

[56] References Cited

U.S. PATENT DOCUMENTS 5,437,942 8/1995 Murata et al. .......................... 429/192

5,449,576 9/1995 Anani ................................. 429/192 X

*Primary Examiner*—Stephen Kalafut

*Attorney, Agent, or Firm*—Zachary T. Wobensmith, III

[57] ABSTRACT

Composite layered solid or semi-solid state polymeric electrolytes which contain at least a first layer which is a tough, mechanically strong adhesive layer which is non-reactive with alkali metal and preferably polyalkylene oxide based such as PEO, which is applied to an anode, and a second layer applied to a cathode which is a moist, adhesive layer which may be reactive with alkali metal, is loaded with aprotic liquids and alkali metal salts which activates the first layer and maintains the cell integrity.

36 Claims, No Drawings

MULTI-LAYER POLYMERIC ELECTROLYTES FOR ELECTROCHEMICAL DEVICES

BACKGROUND OF THE INVENTION

Field of the Invention

A composite solid, or semi-solid state polymer electrolyte for electrochemical devices which is preferably comprised of two layers, with the first layer being a tough, mechanically strong adhesive layer that is non-reactive with alkali metals such as lithium, and the second layer being an adhesive layer containing aprotic liquids and alkali metal salts which migrate into the first layer, but do not destroy the first layer, and do not substantially react with alkali metals.

DESCRIPTION OF THE PRIOR ART

In the prior art, various solid state electrolytes have been proposed for use in electrochemical devices, such as alkali and alkaline earth metal batteries. Among the problems associated with many electrolytes is that they may exhibit poor adherence to the electrodes, and are susceptible to shorting after several cycles due to the low mechanical strength of the commonly used polyethylene oxide (PEO) based plasticized electrolytes, and especially with PC (propylene carbonate). In other electrolytes such as polyacrylonitrile (PAN) and other polymer based electrolytes or their alloys, bubbles are often trapped in the dense mix which creates pinholes which result in dendrite growth, or the electrolytes react with the alkali metal anode and create dendric dust in the anode interface, resulting in the subsequent failure of the device. Examples of various electrolytes are disclosed in the U.S. patents to Hope, et al U.S. Pat. No. 5,006,431; Abraham et al, U.S. Pat. No. 5,219,679; Chesire et al, U.S. Pat. No. 5,001,023; Nakajima U.S. Pat. No. 5,017,444, Lee et al U.S. Pat. No. 4,990,413 and Chua et al U.S. Pat. No. 5,240,790.

The multi layer polymeric electrolytes of the invention do not suffer from the problems of prior art electrolytes and provide many positive advantages.

SUMMARY OF THE INVENTION

It has now been found that composite polymer electrolytes can be made by using at least two layers to form the electrolyte, which is highly ion conductive, inert to alkali or alkaline earth metal battery components, flexible and tough enough to resist dendrite formation, with increased electrochemical and temperature stability, and improved cycling characteristics. The first layer is tough, preferably polyalkylene oxide based, such as PEO, which is highly adhesive, mechanically strong, ionically permeable and substantially non-reactive with alkali metals, which acts to prevent dendrite formation and shorting of the device. The first polymeric layer is coated, preferably cold, onto at least one electrode at room temperature and is solidified by solvent evaporation or other means. The second layer which is moist, and adhesive, is applied as a hot melt, and is loaded with aprotic liquids and alkali metal salts which soak into and activate the first layer, but do not destroy it. The first layer is preferably formed on the anode, and the second layer preferably on the cathode, after which they are assembled to form the electrochemical device. The second layer is preferably solidified by cooling to room temperature or by other known methods, such as electron beam treatment or other radiation treatment, and may also be resistant to high temperatures after solidification, and the polymer component may be reactive with alkali metals, which also stops dendrite growth. The aprotic liquids in the second layer must be selected from a group which does not destroy the first polymeric layer, and do not substantially react with alkali metals. The same or similar additional polymeric layers may also be added or inserted as required.

The principal object of the invention is to provide a composite, multilayer solid or semi-solid state polymer electrolyte for batteries and other electrochemical devices, that has excellent ionic conductivity, is flexible and tough, but easy to handle and produce.

A further object of the invention is to provide an electrolyte of the character aforesaid that has excellent adherence and low shrinkage properties.

A further object of the invention is to provide an electrolyte of the character aforesaid, that is resistant to dendrite formation and shorting.

A further object of the invention is to provide an electrolyte of the character aforesaid which has improved electrochemical stability.

A further object of the invention is to provide an electrolyte of the character aforesaid which has improved cycling characteristics.

A further object of the invention is to provide an electrolyte of the character aforesaid which has improved temperature stability.

A further object of the invention is to provide an electrolyte of the character aforesaid that is highly suitable for mass production.

Other objects and advantageous features of the invention will be apparent from the description and claims.

It should, of course, be understood that the description is merely illustrative and that various modifications, combinations and changes can be made in the structures disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Electrochemical devices such as alkali metal batteries, and for example lithium polymer batteries, consist of at least an anode layer, a polymer electrolyte layer, and a cathode layer. Such batteries may be of virtually any desired size and configuration, and usually include additional layers such as current conducting backing layers, insulating layers and electrode connection layers.

The polymer dielectric composite layered electrolyte of the invention must be compatible with the component materials used to fabricate the batteries while possessing suitable ionic conductivity and mechanical strength.

In the described battery, fabrication preferably takes place in an inert dry atmosphere. To construct the battery, an anode is provided which can be of lithium foil or lithium alloy foil such as described in U.S. Pat. No. 5,350,647. The anode is coated with the first layer of electrolyte, which electrolyte is at room temperature and contains solvent which is allowed to evaporate. The second layer of electrolyte is heated and coated while hot preferably onto the cathode, which may be a $V_6O_{13}$ based composite sheet, and the second electrolyte layer can optionally have had a woven or non-woven electrically non-conductive net inserted therein. If desired, the second layer of electrolyte may be formed as a film which is then applied to the cathode. To form the electrochemical device, the pre-coated anode layer is placed on top and facing the cathode layer, and the assembly is rolled together. Additional layers may then be added as required. The first layer is preferably polyalkylene oxide based such as PEO, which is tough, highly adhesive, mechanically strong, ionically permeable and substantially non-reactive with lithium, which acts to prevent dendrite formation and shorting of the device. The first polymeric layer is coated, preferably onto at least one electrode at room temperature, and solidified by solvent evaporation. The second layer which is soft, moist, and adhesive, is applied as a hot melt, and is loaded with aprotic liquids and alkali metal salts which soak into and activate the first layer, but do not destroy it, and do not substantially react with alkali metals. The first layer is preferably formed on the anode, and the second layer on the cathode, after which they are assembled to form the electrochemical device. The second layer is preferably solidified by cooling to room temperature or other known method such as electron beam treatment or other radiation treatment, may also be resistant to high temperature after solidification, and the polymer component may be reactive with alkali metals which also stops dendrite growth. The aprotic liquids in the second layer must be selected from a group which does not destroy the first polymeric layer, and do not substantially react with alkali metals.

The first layer contains a mixture of an ether such as THF and an ester such as EC, a polymer such as PEO, and at least one alkali metal salt such as lithium triflate. The first layer may also contain only PEO and an alkali metal salt. The second layer contains a mixture of a plurality of esters, or an ether and at least one ester with an alkali metal salt and preferably a PEO or a PVDF-PEO based alloy. The following examples were constructed in accordance with the invention and in a dry inert atmosphere.

EXAMPLE #1

A. The first layer, which was a PEO based coating, was applied to an anode of metallic lithium alloy. The coating was prepared by mixing:

| | |
|---|---|
| 1. 252 g THF | (tetrahydrofuran) |
| 2. 63 g EC | (Ethylene Carbonate) |
| 3. 15.6 g Li-Triflate | (Lithium Triflate) |
| 4. 6 g (PEO) | (Polyethylene Oxide) |

The mixture was heated to 60 degrees celsius while being mixed with a magnetic stirrer in a closed bottle to dissolve the PEO, and was then cooled to room temperature to minimize reactivity with the lithium. The anode of lithium foil, or lithium alloy foil as described in U.S. Pat. No. 5,350,647 was dipped into the mixture to ensure uniform coating. The THF was allowed to substantially evaporate, and preferably for 1 hour, while the foil was suspended in dry air. The resulting tough coating or "skin" on the anode foil was approximately 2 mils thick. It should be noted that the mixture could also be coated on only one side of the anode foil, by any well-known means such as a doctor blade, or by extruding the coating through a slot similar to well-known hot melt coaters. The evaporation of the THF can be accelerated by blowing dry air or dry inert gas on the coated surface, and the THF solvent is preferably recovered by using a condenser. The anode which has been dip-coated on both sides may be used in constructing a bi-cell device which has two cathodes.

The THF component determines the thickness of the layer and is varied as required. After exclusion of the THF, the EC component is useful in a range of 1% to 60% by percentage weight, the Li-triflate component is useful in a range of 1% to 50% by percentage weight, and the PEO component is useful in a range of 0.5% to 70% by percentage weight.

B. The second (adhesive) layer was coated onto the cathode. This layer is PVDF-PEO alloy based, and was prepared by mixing:

| | |
|---|---|
| 1. 27 g DMC | (Dimethyl Carbonate) |
| 2. 13 g EC | (Ethylene Carbonate) |
| 3. 5 g Li-perchlorate | (Lithium Perchlorate) |
| 4. 6.5 g homopolymer PVDF | (Polyvinyldienefluoride) |
| 5. 1 g PEO | (Polyethylene Oxide) |

In the second layer, the DMC component is useful in a range of 0.1% to 90% by percentage weight, the PVDF component which is useful in a range of 0.1% to 50% by percentage weight improves the temperature resistance of the alloy. The EC component is useful in a range of 0.1% to 60% by percentage weight, the Li-perchlorate component is useful in a range of 1% to 50% by percentage weight, and the PEO component which is useful in a range of 0.5% to 70% by percentage weight, improves the ionic conductivity and makes the alloy flexible.

The mixture was heated to 90 degrees celsius to accelerate blending in the PVDF and PEO, while being mixed in a closed bottle with a magnetic stirrer, and the mixture is then applied to the cathode sheet by a doctor blade or by extrusion, which sheet is preferably $V_6O_3$ based. A woven or non-woven electrically non-conducting and inert net, or mesh may be inserted into the layer while the layer is still hot and liquid, as described in U.S. Pat. No. 5,102,752 and patent application Ser. No. 08/286,345 of Joseph B. Kejha. With the net enveloped and the adhesive layer at a thickness of two mils, the layer was cooled but while still tacky—the pre-coated anode was placed on top with the first layer facing the second layer, and the assembly was rolled together. The resultant cell provided 3.81 volts, and was rechargeable with several hundred cycles obtained.

It should be noted that the homopolymer PVDF in the alloy may be replaced by a copolymer of PVDF/HFP (such as Elf-Atochem #2801 Kynar) (HFP=Hexafluoropropylene and the DMC may be replaced by THF, DME (Dimethoxty ethane) or other ethers, of the same percentage weight. For other alkali metal or alkaline earth metal based batteries (other than lithium based)—the lithium-perchlorate and lithium-triflate salts should be replaced by perchlorate and triflate salts matching the selected alkali or alkaline earth metal.

EXAMPLE 2

A. The first layer, which is a PEO based coat, was applied to an anode of metallic lithium alloy. The coating layer was prepared by mixing:

| | |
|---|---|
| 1. 252 g THF | (tetrahydrofuran) |
| 2. 63 g EC | (Ethylene Carbonate) |
| 3. 15.6 g Li-Triflate | (Lithium triflate) |
| 4. 6 g (PEO) | (Polyethylene Oxide) |

The mixture was heated to 60 degrees celsius to accelerate blending in the PEO while being mixed with a magnetic stirrer in a closed bottle, and was then cooled to room temperature to minimize reactivity with the lithium. The anode of lithium foil, or lithium alloy foil as described in U.S. Pat. No. 5,350,647 was dipped into the mixture to ensure uniform coating. The THF was allowed to substantially evaporate, and preferably for 1 hour, while the foil was suspended in dry air. The resulting tough coating or "skin" on the anode foil was approximately 2 mils thick. It should be noted that the mixture could also be coated on only one side of the anode foil by any well-known means such as a doctor blade, or by extruding the coating through a slot similar to well-known hot melt coaters. The evaporation of the THF can be accelerated by blowing dry air or dry inert gas on the coated surface, and the THF solvent is preferably recovered by using a condenser. The anode which has been dip-coated on both sides may be used in constructing a bi-cell device which has two cathodes.

The THF component determines the thickness of the layer and is varied as required. After exclusion of the THF, the EC component is useful in a range of 1% to 60% by percentage weight, the lithium-triflate component is useful in a range of 1% to 50% by percentage weight, and the PEO component is useful in a range of 0.5% to 70% by percentage weight.

B. The second (adhesive) layer was coated onto the cathode. This layer is also PEO based, and was prepared by mixing:

| | |
|---|---|
| 1. 42 g DMC | (Dimethyl Carbonate) |
| 2. 21 g EC | (Ethylene Carbonate) |
| 3. 7.8 g Li-triflate | (Lithium triflate) |
| 4. 2 g PEO | (Polyethylene Oxide) |

The DMC component is useful in a range of 0.1% to 90% by percentage weight, the EC component is useful in a range of 0.1% to 60% by percentage weight, the lithiumi-triflate component is useful in a range of 1% to 50% by percentage weight, and the PEO component is useful in a range of 0.5% to 70% by percentage weight.

The mixture was heated to 90 degrees celsius while being mixed in a closed bottle with a magnetic stirrer to accelerate blending in the PEO, and then applied to the cathode sheet by a doctor blade or extrusion, which sheet is preferably $V_6O_{13}$ based. A woven or non-woven electrically non-conducting and inert net, or mesh may be inserted into the layer while the layer is still hot and liquid, as described in U.S. Pat. No. 5,102,752, and the pending patent application Ser. No. 08/286,345 of Joseph B. Kejha et al. With the net enveloped and the adhesive layer at a thickness of two mils, the layer was cooled, but while still tacky—the pre-coated anode was placed on top with the first layer facing the second layer and the assembly was rolled together. The resultant cell provided 3.81 volts, and was rechargeable with several hundred cycles obtained.

It should be noted that for low temperature device operation, the DMC may be replaced by DEC (Diethyl Carbonate) or other esters or ethers which do not destroy the PEO in the first layer, of the same percentage weight range. For other alkali metal or alkaline earth metal based batteries (other than lithium-based)—the lithium-triflate salt should be replaced by a triflate salt matching the selected metal. Because both layers in the example are PEO based, the layers may also be reversed.

EXAMPLE #3

A. The first layer, a PEO-PVDF alloy-based mixture was prepared by mixing:

| | |
|---|---|
| 1. 245 g THF | (tetrahydrofuran) |
| 2. 32.5 g DMC | (Dimethyl Carbonate) |
| 3. 16 g EC | (Ethylene Carbonate) |
| 4. 6 g Li-triflate | (Lithium triflate) |
| 5. 2.5 g homopolymer PVDF | (Polyvinyldienefluoride) |
| 6. 6 g PEO | (Polyethylene Oxide) |

The mixture was heated to 60 degrees celsius to accelerate blending in the PEO while being mixed with a magnetic stirrer in a closed bottle, and the mixture was then cooled to room temperature to minimize reactivity with the lithium. The anode of lithium foil, or lithium alloy foil as described in U.S. Pat. No. 5,350,647 was dipped into the mixture to ensure uniform coating. The THF was allowed to substantially evaporate, and preferably for 1 hour, while the foil was suspended in dry air. The resulting tough coating or "skin" on the anode foil was approximately 2 mils thick. It should be noted that the mixture could also be coated on only one side of the anode foil by any well-known means such as a doctor blade, or by extruding the coating through a slot similar to well-known hot melt coaters. The evaporation of the THF can be accelerated by blowing dry air or dry inert gas on the coated surface, and the THF solvent is preferably recovered by using a condenser. The anode which has been dip-coated on both sides may be used in constructing a bi-cell device which has two cathodes. The THF component determines the thickness of the layer and is varied as required.

After exclusion of the THF, the DMC component is useful in a range of 0.1% to 90% by percentage weight, the EC component is useful in a range of 0.1% to 60% by percentage weight, the Li-triflate component is useful in a range of 1% to 50% by percentage weight, the PVDF component is useful in a range of 0.1 to 70% by percentage weight, and the PEO component which is useful in a range of 0.5% to 70% by percentage weight, improves ionic conductivity and makes the alloy flexible. It should be noted that the PVDF homopolymer in the alloy may be replaced by a PVDF/HFP copolymer of the same percentage weight. For other alkali metal devices, the lithium salts should be replaced by salts matching the selected alkali metal.

B. The second (adhesive) layer was the same as described in Example #1B (PVDF-PEO alloy based) and the second layer was also constructed as described in example #2B (PEO based), or as will be described in example #4B (PVDF-PEO alloy based). The layers were applied as described above in Example #1 and provided 3.75 volts and several hundred cycles.

EXAMPLE 4

A. The first layer was a PEO-based coat applied to a metallic lithium alloy. It was prepared by mixing;

| | |
|---|---|
| 1. 252 g THF | (tetrahydrofuran) |
| 2. 63 g EC | (Ethylene Carbonate) |
| 3. 15.6 g Li-triflate | (Lithium triflate) |
| 4. 6 g PEO | (Polyethylene Oxide) |

The mixture was heated to 60 degrees celsius to accelerate blending in the PEO while being mixed with a magnetic stirrer in a closed bottle, and was then cooled to room temperature to minimize reactivity with the lithium. The anode of lithium foil, or lithium alloy foil as described in U.S. Pat. No. 5,350,647 was dipped into the mixture to ensure uniform coating. The THF was allowed to substantially evaporate, and preferably for 1 hour, while the foil was suspended in dry air. The resulting tough coating or "skin" on the anode foil was approximately 2 mils thick. It should be noted that the mixture could also be coated on only one side of the anode foil, by any well-known means such as a doctor blade, or by extruding the coating through a slot similar to well-known hot melt coaters. The evaporation of the THF can be accelerated by blowing dry air or dry inert gas on the coated surface, and the THF solvent is preferably recovered by using a condenser. The anode which has been dip-coated on both sides may be used in constructing a bi-cell device which has two cathodes.

The THF component determines the thickness of the layer and is varied as required. After exclusion of THF, the EC component is useful in a range of 1% to 60% by percentage weight, the Li-triflate component is useful in a range of 1% to 50% by percentage weight, and the PEO component is useful in a range of 0.5% to 70% by percentage weight.

B. The second (adhesive) layer was coated on the cathode. This layer was a PVDF/HFP-PEO based alloy which was prepared by mixing:

| | |
|---|---|
| 1. 40 g DMC | (Dimethyl Carbonate) |
| 2. 20 g EC | (Ethylene Carbonate) |
| 3. 6.9 g Li-triflate | (Lithium triflate) |
| 4. 8.8 g PVDF/HFP copolymer | (Polyvinyldienefluoride/Hexafluoro-propylene) |
| 6. 1.76 g PEO | (Polyethylene Oxide) |

In the second layer, the DMC component is useful in a range of 0.1% to 90% by percentage weight, the EC component is useful in a range of 0.1% to 60% by percentage weight, the Li-triflate component is useful in a range of 1% to 50% by percentage weight, the PVDF/HFP component is useful in a range of 0.1% to 70% by percentage weight, and improves the temperature resistance of the alloy, and the PEO component is useful in a range of 0.5% to 70% by percentage weight and improves the ionic conductivity and makes the alloy flexible.

The mixture was heated to 90 degrees celsius to accelerate blending in the PVDF/HFP and PEO while being mixed in a closed bottle with a magnetic stirrer, and the mixture was then applied to the cathode sheet by a doctor blade or by extrusion, which sheet is preferably $V_6O_{13}$ based. A woven or non-woven electrically non-conducting and inert net, or mesh may be inserted into the layer while the layer is still hot and liquid, as described in U.S. Pat. No. 5,102,752 and patent application Ser. No. 08/286,345 of Joseph B. Kejha. With the net enveloped and the adhesive layer at a thickness of two mils, the layer was cooled, but while still tacky—the pre-coated anode was placed on top with the first layer facing the second layer, and the assembly was rolled together. The resultant cell provided 3.81 volts, and was rechargeable with several hundred cycles obtained.

It should be noted that the copolymer PVDF/HFP in the alloy may be replaced by a homopolymer of PVDF (such as Kynar #711, Elf Atochem) and the DMC may be replaced by THF, DME (Dimethoxty ethane) or other ethers, of the same percentage weight. For other alkali metal or alkaline earth metal based batteries (other than lithium based)—the lithium-perchlorate and lithium-triflate salts should be replaced by perchlorate and triflate salts matching the selected alkali or alkaline earth metal.

EXAMPLE 5

A. The first layer (PEO Based) was prepared by mixing:

| | |
|---|---|
| 1. 200 g THF | (tetrahydrofuran) |
| 2. 16 g Li-Triflate | (Lithium Triflate) |
| 3. 6 g (PEO) | (Polyethylene Oxide) |

The mixture was heated to 60 degrees celsius to accelerate blending in the PEO, while being mixed with a magnetic stirrer in a closed bottle, and the mixture was then cooled to room temperature to minimize reactivity with the lithium. The anode of lithium foil, or lithium alloy foil as described in U.S. Pat. No. 5,350,647 was dipped into the mixture to ensure uniform coating. The THF was allowed to substantially evaporate, and preferably for 1 hour, while the foil was suspended in dry air. The resulting tough coating or "skin" on the anode foil was approximately 2 mils thick. It should be noted that the mixture could also be coated on only one side of the anode foil, by any well-known means such as a doctor blade, or by extruding the coating through a slot similar to well-known hot melt coaters. The evaporation of the THF can be accelerated by blowing dry air or dry inert gas on the coated surface, and the THF solvent is preferably recovered by using a condenser. The anode which has been dip-coated on both sides may be used in constructing a bi-cell device which has two cathodes.

The THF component determines the thickness of the layer and is varied as required. After exclusion of the THF, the EC component is useful in a range of 1% to 60% by percentage weight, the Li-triflate component is useful in a range of 1% to 90% by percentage weight, and the PEO component is useful in a range of 0.5% to 90% by percentage weight.

B. The Second (adhesive) layer may be the same as described in example #1B, #2B or #4B. The application of the layers may be the same as described in example #1.

It is apparent that the second layer facing the cathode may be of any polymer based material which is compatible with and does not destroy the first layer. In addition, in all cases described, additional layers of the same compositions as disclosed may be added to create a multilayer composite electrolyte, but the first non-reactive layer should always contact the anode. The described electrolytes solve the problem of alkali metal anode interface reactivity and provide long cycle life. The described electrolytes may also be useful in lithium-ion batteries or other alkali metal-ion batteries.

It will thus be seen that multi-layer polymeric electrolytes for electrochemical devices have been described for which the objects of the invention were attained.

We claim:

1. An electrochemical device having a metallic anode and a cathode, with a composite, layered, solid or semi-solid state polymeric electrolyte in contact therewith, which electrolyte comprises a first ion conductive polymeric layer in contact with said anode, which layer is substantially non-reactive with alkali or alkaline earth metals, and a second layer in contact with said first layer and said cathode, which is an ion conductive polymer layer, which contains at least one aprotic liquid, and at least one alkali metal salt, which soaks into and activates the first layer and does not destroy the first layer.

2. A composite layered polymeric electrolyte as defined in claim 1 in which said first layer is a polyalkylene oxide based coating which contains at least one ether, at least one ester, and at least one alkali metal salt.

3. A composite layered polymeric electrolyte as defined in claim 1 in which said second layer is a polyvinyldienefluoride homopolymer—polyalkylene oxide alloy based coating.

4. A composite layered polymeric electrolyte as defined in claim 1 in which said second layer is a polyvinyldienefluoride copolymer—polyalkylene oxide alloy based coating.

5. A composite layered polymeric electrolyte as defined in claim 1 in which said first layer is a polyalkylene oxide based coating which contains at least one ester, and at least one alkali metal salt.

6. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains an ether, an ester, an alkali-metal salt, and a second layer in contact with said first layer, and said cathode, which layer is a polyvinyldienefluoride-polyethylene oxide alloy based coating which contains a plurality of esters and an alkali metal salt.

7. A composite, layered solid or semi-solid state polymeric electrolyte for electrochemical devices as defined in claim 6 in which said first layer contains tetrahydrofuran, from 0.01% to 40% by percentage weight, ethylene carbonate in the range of 1% to 60%, by percentage weight, lithium triflate in the range of 1% to 50% by percentage weight, polyethylene oxide in the range of 0.5 to 70% by percentage weight, and said second layer contains dimethyl carbonate in the range of 0.1% to 90% by percentage weight, ethylene carbonate in the range of 0.1% to 60% by percentage weight, lithium perchlorate in the range of 1% to 50% by percentage weight, polyvinyldienefluoride in the range of 0.1% to 50% by percentage weight, and polyethylene oxide in the range of 0.5% to 70% by percentage weight.

8. A composite, layered solid, or semi-solid state polymeric electrolyte for electrochemical devices as defined in claim 6 in which said first layer contains tetrahydrofuran from 0.01% to 40% by percentage weight, ethylene carbonate in the range of 0.1% to 60% by percentage weight, lithium triflate in the range of 1% to 50% by percentage weight, and polyethylene oxide in the range of 0.5% to 70% by percentage weight, and said second layer contains dimethyl carbonate in the range of 0.1% to 90% by percentage weight, ethylene carbonate in the range of 0.1% to 60% by percentage weight, lithium triflate in the range of 1% to 50% by percentage weight, polyvinyldienefluoride in the range of 0.1% to 50% by percentage weight, and polyethylene oxide in the range of 0.5% to 70% by percentage weight.

9. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains an ether, an ester, an alkali metal salt, and a second layer in contact with said first layer and said cathode, which layer is a polyvinyldienefluoride/hexafluoropropylene-polyethylene oxide alloy based coating which contains a plurality of esters and an alkali metal salt.

10. A composite, layered solid or semi-solid state polymeric electrolyte for electrochemical devices as defined in claim 9, in which said first layer contains tetrahydrofuran from 0.01% to 40% by percentage weight, ethylene carbonate in the range of 1% to 60% by percentage weight, lithium triflate in the range of 1% to 50% by percentage weight, polyethylene oxide in the range of 0.5% to 70% by percentage weight, and said second layer contains dimethyl carbonate in the range of 0.1% to 90% by percentage weight, ethylene carbonate in the range of 0.1% to 60% by percentage weight, lithium perchlorate in the range of 1% to 50% by percentage weight, polyvinyldienefluoride/hexafluoropropylene in the range of 0.1% to 50% by percentage weight, and polyethylene oxide in the range of 0.5% to 70% by percentage weight.

11. A composite, layered solid or semi-solid state polymeric electrolyte for electrochemical devices as defined in claim 9, in which said first layer contains tetrahydrofuran from 0.01% to 40% by percentage weight, ethylene carbonate in the range of 1% to 60% by percentage weight, lithium triflate in the range of 1% to 50% by percentage weight, polyethylene oxide in the range of 0.5% to 70% by percentage weight, and said second layer contains dimethyl carbonate in the range of 0.1% to 90% by percentage weight, ethylene carbonate in the range of 0.1% to 60% by percentage weight, lithium triflate in the range of 1% to 50% by percentage weight, polyvinyldienefluoride/hexafluoropropylene in the range of 0.1% to 70% by percentage weight, and polyethylene oxide in the range of 0.5% to 70% by percentage weight.

12. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains at least one ester, an alkali metal salt, and a second layer in contact with said first layer and said cathode, which layer is a polyvinyldienefluoride/hexafluoropropylene-polyethylene oxide alloy based coating which contains an ether, at least one ester and an alkali metal salt.

13. A composite layered electrolyte as defined in claim 12 in which said first layer contains ethylene carbonate in the range of 0.1% to 60%, by percentage weight, lithium triflate in the range of 1% to 50% by percentage weight, and polyethylene oxide in the range of 0.5% to 70% by percentage weight, and said second layer contains dimethyl carbonate in the range of 0.1% to 90% by percentage weight, ethylene carbonate in the range of 0.1% to 60% by percentage weight, lithium triflate in the range of 1% to 50% by percentage weight, polyvinyldienefluoride/hexafluoropropylene in the range of 0.1% to 70% by percentage weight, and polyethylene oxide in the range of 0.5% to 70% by percentage weight.

14. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains at least one ester, an alkali metal salt, and a second layer in contact with said first layer and said cathode, which layer is a polyvinyldienefluoride/polyethylene oxide alloy based coating which contains an ether, at least one ester and an alkali metal salt.

15. A composite, layered solid or semi-solid state polymeric electrolyte for electrochemical devices as defined in claim 14, in which said first layer contains tetrahydrofuran from 0.01% to 40% by percentage weight, ethylene carbonate in the range of 1% to 60% by percentage weight, lithium triflate in the range of 1% to 50% by percentage weight, polyethylene oxide in the range of 0.5% to 70% by percentage weight, and said second layer contains tetrahydrofuran in the range of 0.1% to 90% by percentage weight, ethylene carbonate in the range of 0.1% to 60% by percentage weight, lithium perchlorate in the range of 1% to 50% by percentage weight, polyvinyldienefluoride in the range of 0.1% to 50% by percentage weight, and polyethylene oxide in the range of 0.5% to 70% by percentage weight.

16. A composite, layered solid or semi-solid state polymeric electrolyte for electrochemical devices as defined in claim 14, in which said first layer contains lithium triflate in the range of 1% to 50% by percentage weight, and polyethylene oxide in the range of 0.5% to 70% by percentage weight, and said second layer contains dimethyl carbonate in the range of 0.1% to 90% by percentage weight, ethylene carbonate in the range of 0.1% to 60% by percentage weight, lithium triflate in the range of 1% to 50% by percentage weight, polyvinyldienefluoride in the range of 0.1% to 50% by percentage weight, and polyethylene oxide in the range of 0.5% to 70% by percentage weight.

17. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains at least one ester, an alkali metal salt, and a second layer in contact with said first layer and said cathode, which layer is a polymer based coating which contains at least one alkali metal salt, and at least one aprotic liquid selected from a group which does not dissolve or attack polyethylene oxide.

18. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains an ether, an ester, an alkali metal salt, and a second layer in contact with said first layer and said cathode, which layer is a polyethylene oxide based coating, which contains a plurality of esters and an alkali metal salt.

19. A composite, layered solid or semi-solid state polymeric electrolyte for electrochemical devices as defined in claim 18 in which said first layer contains tetrahydrofuran from 0.01% to 40% by percentage weight, ethylene carbonate in the range of 1% to 60%, by percentage weight, lithium triflate in the range of 1% to 50% by percentage weight and polyethylene oxide in the range of 0.5% to 70% by percentage weight, and said second layer contains dimethyl carbonate in range of 0.1% to 90% by percentage weight, ethylene carbonate in the range of 0.1% to 60% by percentage weight, lithium triflate in the range of 1% to 50% by percentage weight, and polyethylene oxide in the range of 0.5% to 70% by percentage weight.

20. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains at least one ester and an alkali metal salt, and a second layer in contact with said first layer and said cathode, which layer is a polyethylene oxide based coating which contains an ether, at least one ester and an alkali metal salt.

21. An electrochemical device having a metallic anode and a cathode, with a composite, layered, solid or semi-solid state polymeric electrolyte in contact therewith, which electrolyte comprises a first layer in contact with said anode, which layer is a polyethylene oxide-polyvinyldienefluoride alloy based coating which contains an ether, a plurality of esters, and an alkali metal salt, and a second layer in contact with said first layer and said cathode, which layer is a polyvinyldienefluoride-polyethylene oxide alloy based coating which contains a plurality of esters, and an alkali metal salt.

22. A composite, layered solid or semi-solid state polymeric electrolyte for electrochemical devices as defined in claim 21 in which said first layer contains tetrahydrofuran from 0.01% to 40% by percentage weight, dimethyl carbonate in the range of 0.1% to 90% by percentage weight, ethylene carbonate in the range of 0.1% to 60%, by percentage weight, lithium triflate in the range of 1% to 50% by percentage weight, polyvinyldienefluoride in the range of 0.1% to 70% by percentage weight, and polyethylene oxide in the range of 0.5% to 70% by percentage weight, and said second layer contains dimethyl carbonate in the range of 0.1% to 90% by percentage weight, ethylene carbonate in the range of 0.1% to 60% by percentage weight, lithium perchlorate in the range of 1% to 50% by percentage weight, polyvinyldienefluoride in the range of 0.1% to 70% by percentage weight, and polyethylene oxide in a range of 0.5% to 70% by percentage weight.

23. An electrochemical device having a metallic anode and a cathode, with a composite, layered, solid or semi-solid state polymeric electrolyte in contact therewith, which electrolyte comprises a first layer in contact with said anode, which layer is a polyethylene oxide-polyvinyldienefluoride/hexafluoropropylene alloy based coating which contains at least one ester and an alkali metal salt, and a second layer in contact with said first layer and said cathode, which layer is a polyethylene oxide-polyvinyldienefluoride/hexafluoropropylene alloy based coating which contains an ether, at least one ester, and an alkali metal salt.

24. An electrochemical device having a metallic anode and a cathode, with a composite, layered, solid or semi-solid state polymeric electrolyte in contact therewith, which electrolyte comprises a first layer in contact with said anode, which layer is a polyethylene oxide-polyvinyldienefluoride/hexafluoropropylene alloy based coating which contains at least one ester and an alkali metal salt, and a second layer in contact with said first layer and said cathode, which layer is a polyethylene oxide based coating which contains an ether, at least one ester, and an alkali metal salt.

25. An electrochemical device having a metallic anode and a cathode, with a composite, layered, solid or semi-solid state polymeric electrolyte in contact therewith, which electrolyte comprises a first layer in contact with said anode, which layer is a polyethylene oxide-polyvinyldienefluoride alloy based coating which contains an ether and a plurality of esters, and a second layer in contact with said first layer and said cathode, which layer is a polyethylene oxide based coating which contains an ether, at least one ester, and an alkali metal salt.

26. An electrochemical device having a metallic anode and a cathode, with a composite, layered solid or semi-solid state polymeric electrolyte in contact therewith, which electrolyte comprises a first layer in contact with said anode, which layer is a polyethylene oxide based coating which contains an ether and an alkali metal salt, and a second layer in contact with said first layer and said cathode which second layer is a polyvinyldienefluoride-polyethylene oxide alloy based coating, which contains a plurality of esters and an alkali metal salt, or a polyvinyldienefluoride/hexafluoropropylene-polyethylene oxide alloy based coating which contains a plurality of esters and an alkali metal salt, or a polyvinyldienefluoride/hexafluoropropylene-polyethylene oxide alloy based coating, which contains an ether, at least one ester and an alkali metal salt, or a polyvinyldienefluoride/polyethylene oxide alloy based coating which contains an ether, at least one ester and an alkali metal salt, or a polymer based coating which contains at least one alkali metal salt, and at least one aprotic liquid selected from a group which does not dissolve or attack polyethylene oxide.

27. A composite, layered solid, or semi-solid state polymeric electrolyte for electrochemical devices as defined in claim 26 in which said first layer contains tetrahydrofuran from 0.01% to 40% by percentage weight, lithium triflate in the range of 1% to 50% by percentage weight, and polyethylene oxide in the range of 0.5% to 70% by percentage weight, and said second layer contains dimethyl carbonate in the range of 0.1% to 90%, ethylene carbonate in the range of 0.1% to 60% by percentage weight, lithium triflate in the range of 1% to 50% by percentage weight, and polyvinyldienefluoride/hexafluoropropylene in the range of 0.1% to 70% by percentage weight, and polyethylene oxide in the range of 0.5% to 70% by percentage weight.

28. A composite, layered solid, or semi-solid state polymeric electrolyte for electrochemical devices as defined in claim 26 in which said first layer contains tetrahydrofuran from 0.01% to 40% by percentage weight, lithium triflate in the range of 1% to 50% by percentage weight, and polyethylene oxide in the range of 0.5% to 70% by percentage weight, and said second layer contains tetrahydrofuran in the range of 0.1% to 90%, ethylene carbonate in the range of 0.1% to 60% by percentage weight, lithium perchlorate in the range of 1% to 50% by percentage weight, polyvinyldienefluoride in the range of 0.1% to 70% by percentage weight, and polyethylene oxide in the range of 0.5% to 70% by percentage weight.

29. A composite, layered solid, or semi-solid state polymeric electrolyte for electrochemical devices as defined in claim 26 in which said first layer contains tetrahydrofuran from 0.01% to 40% by percentage weight, lithium triflate in the range of 1% to 50% by percentage weight, and polyethylene oxide in the range of 0.5% to 70% by percentage weight, and said second layer contains dimethyl carbonate in the range of 0.1% to 90%, ethylene carbonate in the range of 0.1% to 60% by percentage weight, lithium triflate in the range of 1% to 50% by percentage weight, polyvinyldienefluoride in the range of 0.1% to 70% by percentage weight, and polyethylene oxide in the range of 0.5% to 70% by percentage weight.

30. An electrochemical device having a metallic anode and a cathode, with a composite, layered, solid or semi-solid state polymeric electrolyte in contact therewith, which electrolyte comprises a first layer in contact with said anode, which first layer is a polyethylene oxide-polyvinyldienefluoride/hexafluoropropylene alloy based coating which contains at least one ester and an alkali metal salt, and a second layer in contact with said first layer and said cathode which second layer is a polyethylene oxide based coating, which contains a plurality of esters and an alkali metal salt, or a polyethylene oxide based coating which contains an ether, at least one ester and an alkali metal salt.

31. A composite, layered solid, or semi-solid state polymeric electrolyte for electrochemical devices as defined in claim 30 in which said first layer contains tetrahydrofuran from 0.01% to 40% by percentage weight, lithium triflate in the range of 1% to 50% by percentage weight, and polyethylene oxide in the range of 0.5% to 70% by percentage weight, and said second layer contains dimethyl carbonate in the range of 0.1% to 90%, ethylene carbonate in the range of 0.1% to 60% by percentage weight, lithium triflate in the range of 1% to 50% by percentage weight, and polyethylene oxide in the range of 0.5% to 70% by percentage weight.

32. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains an ether and an alkali metal salt, and a second layer in contact with said first layer and said cathode which second layer is a polyvinyldiendfluoride-polyethylene oxide alloy based coating which contains a plurality of esters, and an alkali metal salt, or a polyethylene oxide-polyvinyldienefluoride/hexafluoropropylene alloy based coating which contains an ether, at least one ester, and an alkali metal salt, or a polyethylene oxide based coating, which contains an ether, at least one ester, and an alkali metal salt.

33. An electrochemical device having a metallic anode and a cathode, with a composite, layered, solid or semi-solid state polymeric electrolyte in contact therewith, which electrolyte comprises a first layer in contact with said anode, which layer is a polyethylene oxide based coating which contains an alkali metal salt, and a second layer in contact with said first layer and said cathode, which second layer is a polyvinyldienefluoride-polyethylene oxide alloy based coating which contains a plurality of esters and an alkali metal salt, or a polyvinyldienefluoride/hexafluoropropylene-polyethylene oxide alloy based coating which contains a plurality of esters and an alkali metal salt, or apolyvinyldienefluoride/hexafluoropropylene-polyethylene oxide alloy based coating which contains an ether, at least one ester and an alkali metal salt, or a polyvinyldienefluoride/polyethylene oxide alloy based coating which contains an ether, at least one ester and an alkali metal salt, or a polymer based coating which contains at least one alkali metal salt, and at least one aprotic liquid selected from a group which does not dissolve or attack polyethylene oxide.

34. An electrochemical device having a metallic anode and a cathode, with a composite, layered, solid or semi-solid state polymeric electrolyte in contact therewith, which electrolyte comprises a first layer in contact with said anode, which first layer is a polyethylene oxide based coating which contains an alkali metal salt, and a second layer in contact with said first layer and said cathode, which second layer is a polyethylene oxide based coating, which contains a plurality of esters and an alkali metal salt, or a polyethylene oxide based coating which contains an ether, at least one ester and an alkali metal salt.

35. An electrochemical device having a metallic anode and a cathode, with a composite, layered, solid or semi-solid state polymeric electrolyte in contact therewith, which electrolyte comprises a first layer in contact with said anode, which first layer is a polyethylene oxide based coating which contains an alkali metal salt, and a second layer in contact with said first layer and said cathode, which second layer is a polyvinyldienefluoride-polyethylene oxide alloy based coating which contains a plurality of esters, and an alkali metal salt, or a polyethylene oxide-polyvinyldienefluoride/hexafluoropropylene alloy based coating which contains an ether, at least one ester, and an alkali metal salt, or a polyethylene oxide based coating which contains an ether, at least one ester, and an alkali metal salt.

36. An electrochemical device having a metallic anode and a cathode, with a composite, multi-layered, solid or semi-solid state polymeric electrolyte in contact therewith, which comprises at least three layers, which includes a first layer, a second layer, a third layer and combinations thereof, wherein said first layer is in contact with said anode, which first layer is substantially non-reactive with alkali or alkaline earth metals, or is a polyalkylene oxide based coating which contains at least one ether, at least one ester, and at least one alkali metal salt, or a polyethylene oxide based coating which contains an ether, an ester, and an alkali-metal salt, or a polyethylene oxide based coating which contains at least one ester, and an alkali metal salt, or a polyethylene oxide-polyvinyldienefluoride alloy based coating which contains an ether, a plurality of esters, and an alkali metal salt, or a polyethylene oxide-polyvinyldienefluoride/hexafluoropropylene alloy based coating which contains at least one ester and an alkali metal salt, or a polyethylene oxide-polyvinyldienefluoride alloy based coating which contains an ether and a plurality of esters, and at least one layer in contact with said first layer and said cathode, which is an ion conductive polymer layer which contains at least one aprotic liquid, and at least one alkali metal salt, which soaks into and activates the first layer and does not destroy the first layer, or is a polyvinyldienefluoride homopolymer-polyalkylene oxide alloy based coating, or a polyvinyldienefluoride copolymer-polyalkylene oxide alloy based coating, or a polyalkylene oxide based coating which contains at least one ester, and at least one alkali metal salt, or a polyvinyldienefluoride-polyethylene oxide alloy based coating which contains a plurality of esters and an alkali metal salt, or a polyvinyldienefluoride/hexafluorpropylene-polyethylene oxide based coating which contains a plurality of esters and an alkali metal salt, or a polyvinyldienefluoride/polyethylene oxide alloy based coating which contains an ether, at least one ester and an alkali metal salt, or a polymer based coating which contains at least one alkali metal salt, and at least one aprotic liquid selected from a group which does not dissolve or attack polyethylene oxide, or a polyethylene oxide based coating, which contains a plurality of esters and an alkali metal salt, or a polyethylene oxide based coating which contains an ether, at least one ester and an alkali metal salt, or a polyethylene oxide-polyvinyldienefluoride/hexafluoropropylene alloy based coating which contains an ether, at least one ester, and an alkali metal salt.

* * * * *